(12) United States Patent
Veal et al.

(10) Patent No.: US 7,255,728 B2
(45) Date of Patent: Aug. 14, 2007

(54) APPARATUS AND METHOD FOR DEGASSING LIQUIDS

(75) Inventors: Jonathan Heath Veal, Halifax (GB); Martin David Powell, Leeds (GB); Simon Broughton, Rochdale (GB); Gareth Ian Naylor, Halifax (GB)

(73) Assignee: Ciba Specialty Chemicals Water Treatments Ltd., West Yorkshire, Bradford (GB)

( * ) Notice: Subject to any disclaimer, the term of this patent is extended or adjusted under 35 U.S.C. 154(b) by 309 days.

(21) Appl. No.: 10/502,700

(22) PCT Filed: Jan. 23, 2003

(86) PCT No.: PCT/EP03/00654

§ 371 (c)(1), (2), (4) Date: Jul. 26, 2004

(87) PCT Pub. No.: WO03/066190

PCT Pub. Date: Aug. 14, 2003

(65) Prior Publication Data

US 2005/0223896 A1    Oct. 13, 2005

(30) Foreign Application Priority Data

Feb. 8, 2002    (GB)    ................... 0202990.8

(51) Int. Cl.
*B01D 19/00*    (2006.01)

(52) U.S. Cl. ........................ 95/245; 95/261; 95/265; 96/202; 96/207; 96/211; 528/502 D

(58) Field of Classification Search ............... 95/263, 95/245, 261, 262, 265, 246; 96/189, 202, 96/207, 209, 211; 528/483, 502 D
See application file for complete search history.

(56) References Cited

U.S. PATENT DOCUMENTS 1,782,783 A * 11/1930 Kotzebue ................. 96/171

(Continued)

FOREIGN PATENT DOCUMENTS

DE    286749    2/1991
DE    10016894    10/2001

(Continued)

OTHER PUBLICATIONS

Derwent Abstract No. 2002-083791 [12] for DE 10016894 (2001).

(Continued)

*Primary Examiner*—Frank Lawrence
*Assistant Examiner*—Douglas J. Theisen
(74) *Attorney, Agent, or Firm*—Shiela A. Loggins

(57) ABSTRACT

Apparatus and method for degassing liquids particularly cationic monomers. Fluid comprising liquid to be degassed together with sweep gas is admitted tangentially into a column (10) and forced down the column by a tubular baffle (16) which defines, with the inner wall of the column, an annulus (18) that is closed at its top (20). After passing to the bottom of the annulus the fluid forms an even film over the inner surface of the column and gas disengaging from the liquid can rise up the column while liquid accumulates at the bottom of the column. To assist the disengagement of the gas from the liquid the column is preferably of increasing cross section towards the bottom so that the thickness of the film is also reduced.

13 Claims, 2 Drawing Sheets

U.S. PATENT DOCUMENTS

| | | | |
|---|---|---|---|
| 4,007,022 A | 2/1977 | Schleicher et al. | 55/41 |
| 4,294,676 A | 10/1981 | Boutin et al. | 204/159.23 |
| 4,752,306 A * | 6/1988 | Henriksen | 95/245 |
| 5,256,171 A * | 10/1993 | Payne | 95/19 |
| 5,766,321 A * | 6/1998 | Ishihara et al. | 96/202 |
| 6,193,893 B1 * | 2/2001 | Mazzei et al. | 210/702 |
| 2003/0176636 A1 * | 9/2003 | Liesenfelder et al. | 528/501 |

FOREIGN PATENT DOCUMENTS

DE    10016894 A1 * 10/2001

OTHER PUBLICATIONS

Derwent Abstract No. 1991-193859 [27] for DD 286749 (1991).

* cited by examiner

SECTION A-A

APPARATUS AND METHOD FOR DEGASSING LIQUIDS

The present invention relates to an apparatus and method for the removal of gases from liquids and more particularly the removal, in polymerisation systems, of undesirable dissolved and/or entrained gases from liquids to a desired level.

Attempts have been made to deoxygenate liquids such as cationic monomers using nitrogen as a sweep gas. The equipment proposed for such deoxygenation comprises a column into which the monomer to be deoxygenated together with the sweep gas is introduced towards the middle or upper part of the column. The intention is that the oxygen will be disengaged from the monomer and rise with the sweep gas to be vented at the top of the column while the deoxygenated liquid monomer accumulates at the bottom of the column from where it can be withdrawn through an outlet. One of the problems that has been identified with this system is that the gases rising in the column entrain small amounts of deoxygenated monomer which are deposited in the column above the site where the monomer and sweep gas are introduced. These deposits then dry out and, falling to the bottom of the column, can initiate polymerization of the somewhat unstable deoxygenated monomer thus blocking the monomer outlet.

The present invention seeks to address this problem.

According to the invention there is provided an apparatus for degassing liquids comprising a column, inlet means for admitting liquid to be degassed together with sweep gas tangentially into the column, the sweep gas having been mixed with the liquid prior to admission to the column, a tubular baffle within the column adjacent the inlet means for directing fluid from the inlet means down the column whereby gas disengages from the liquid and rises through the baffle to the top of the column and degassed liquid accumulates at the bottom of the column.

The invention has particular application to the removal of dissolved oxygen from monomers prior to polymerisation thereof in a continuous polymerisation process.

With the invention the tangential admission of liquid to be degassed with the intimately mixed sweep gas into the column imposes a rotational movement on the incoming fluid. The fluid stream is directed downwardly by the baffle and forms a film on the inner surface of the column which film continues to move down the column. The baffle itself prevents any gas that is disengaging from the liquid from rising up the column until the fluid has passed below the baffle at which point gas can rise through the baffle towards the top of the column. As a consequence by the time the gas can rise up the column it is free, or substantially free, of liquid.

In a preferred embodiment of the invention the column, at least below the inlet means, is of progressively enlarging cross section. The consequence of this provision is that as the film moves down the column it is spread over a progressively larger surface area and the film thickness progressively decreases. This arrangement appears to assist decoupling of gases from the liquid.

The inlet means may comprise a plurality of inlets spaced around the column preferably at the same level.

Bearing in mind that the invention is particularly intended to be used as part of a continuous process, even though the amount of any liquid carried up the column by the rising gases and deposited on the upper part of the column will be extremely small nevertheless it can happen that over a long period of time these very small deposits could accumulate and cause the very problems that the invention seeks to solve. If desired therefore, means may be provided for the admission of a liquid, usually water, into the column at a level above the inlet for flushing away any liquid that may, by chance, have been carried up the column by the rising gases and deposited on the upper part of the column.

The invention also provides a method for degassing liquids comprising the steps of admitting liquid to be degassed together with sweep gas tangentially into a column, directing the incoming fluid down the column to form a film on the inner surface of the column whereby gas disengages from the liquid and rises up the column and degassed liquid accumulates at the bottom of the column.

A specific embodiment of the invention will now be described by way of example with reference to the accompanying drawings in which.

Figure 3:
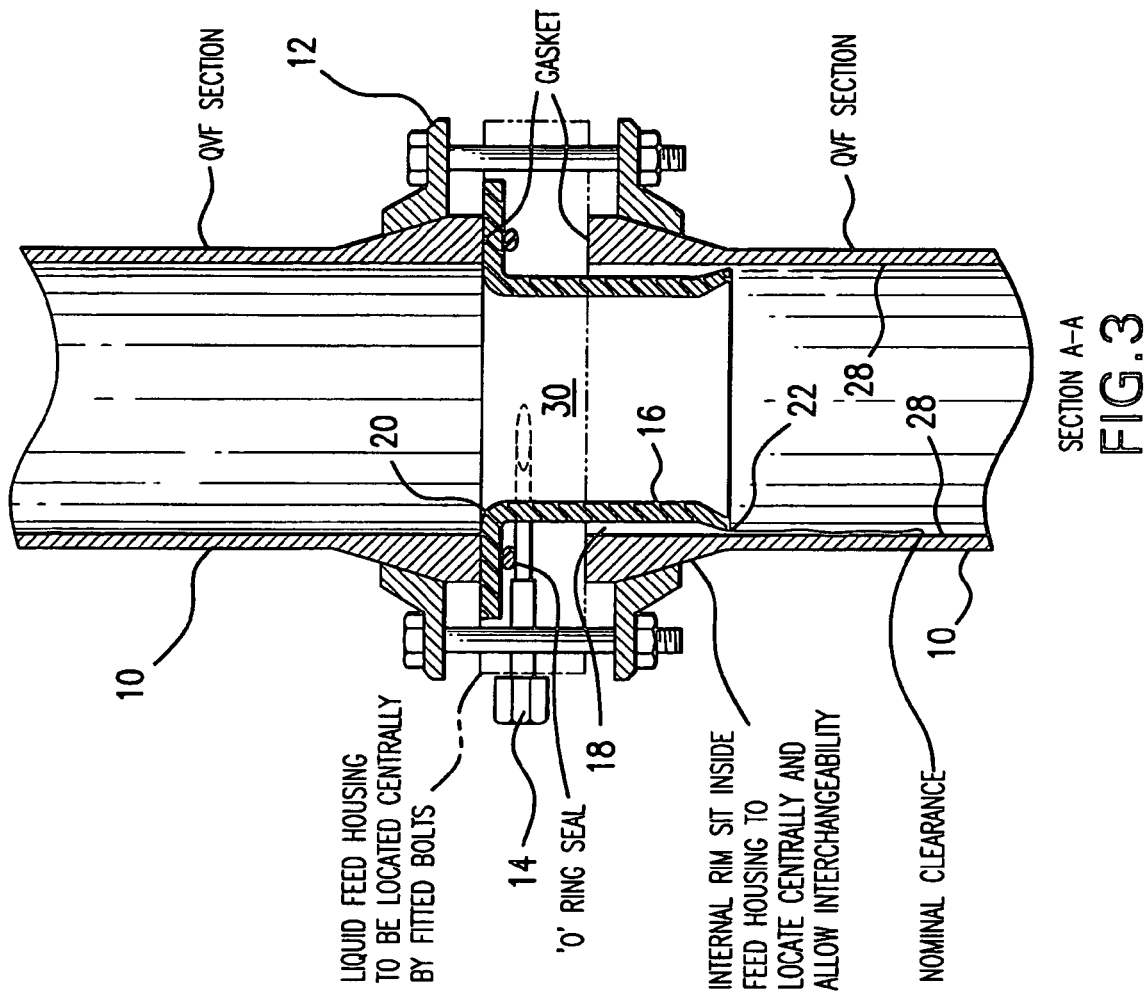
FIG. 2 is a transverse section through a part of the column and on an enlarged scale and FIG. 3 is a section on the line A-A in FIG. 2.
Figure 2:
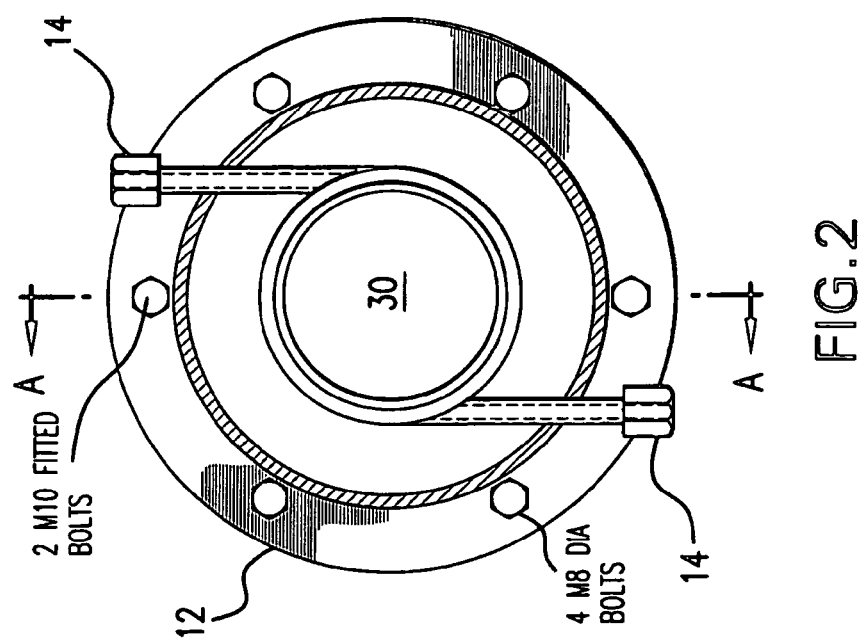

Referring to the drawings the degassing apparatus comprises a column 10 of generally circular cross section and made of material inert to the liquids and gases to be admitted therein. Towards the top of the column an inlet section 12 is provided. The inlet section 12 consists of a number inlets 14 (two in the illustrated embodiment) arranged to direct incoming fluid, i.e. liquid and gas, into the column tangentially with respect to a tubular baffle 16 mounted in the column and coaxial therewith. As can be seen in FIG. 3 the baffle 16 is an open ended tube that defines with the inner wall of the column an annular passageway 18 that is closed at the top 20 and which has a restricted opening 22 at the bottom.

Figure 1:
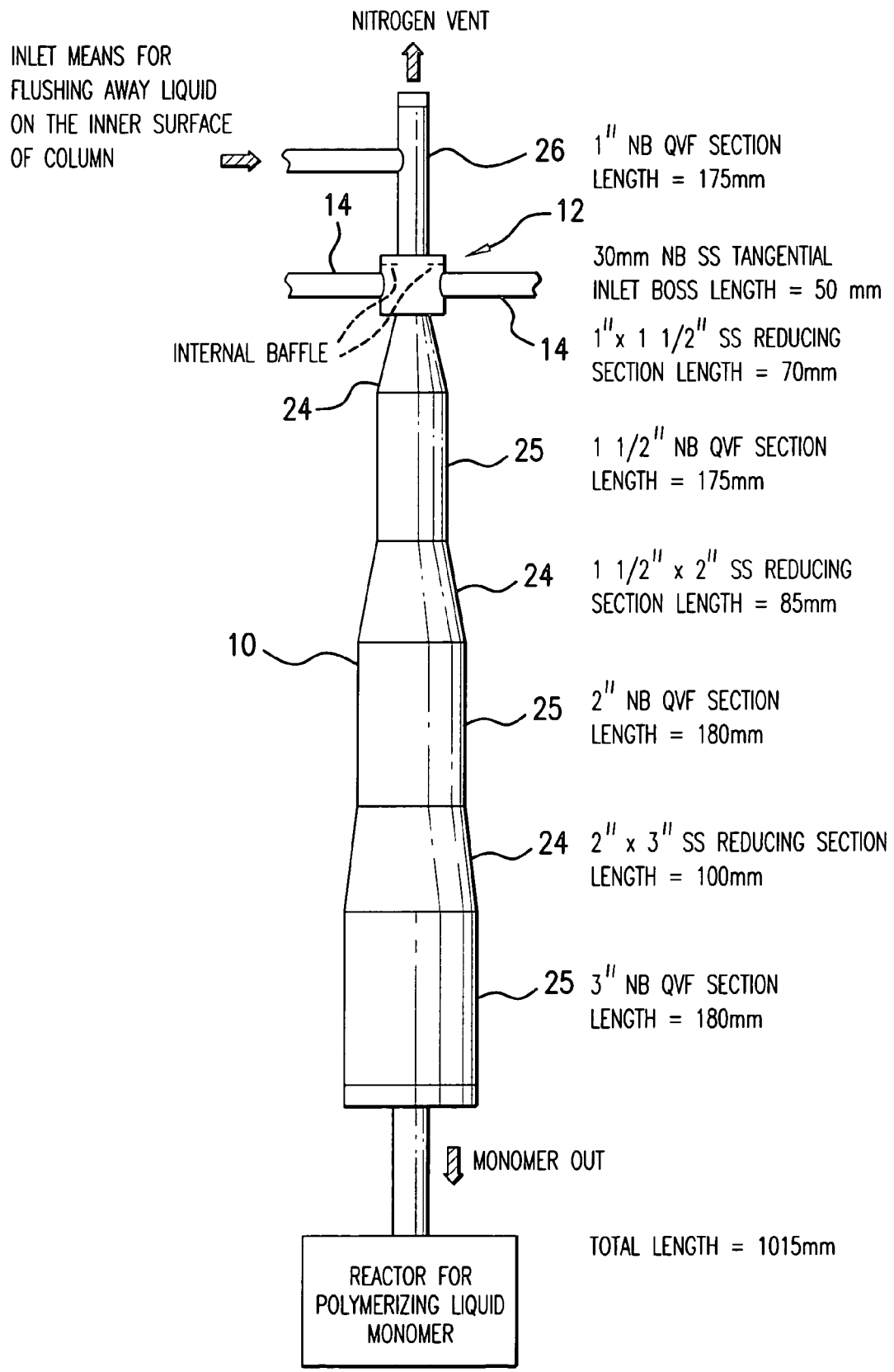
FIG. 1 is a diagrammatic side elevation of a degassing column.

As can be seen in FIG. 1 below the inlet section 12 the column is progressively increasing cross section towards the bottom thereof. In the illustrated embodiment this is achieved by a number of frusto-conical sections 24 interspersed by sections 25 of uniform cross section. This arrangement is not essential however, and the column below the inlet section 12 could be of continuously enlarging cross section. Above the inlet section 12 at 26 the column is preferably of uniform cross section as shown in FIG. 1.

In use the apparatus operates as follows. Liquid to be degassed, such as an aqueous monomer intended for polymerisation and a sweep gas are thoroughly mixed for example in an in-line static mixer. The sweep gas can be any inert gas such as nitrogen. The monomer/sweep gas mixture is admitted into the column through the inlets 14. The incoming fluid swirls around the baffle 16 in the annulus 18 and down to the opening 22. During this time any gas that disengages from the liquid cannot rise up the column until it has passed through the opening 22.

After passing through the opening 22 the fluid appears as a film on the inner surface 28 of the column 10. Preferably the film is substantially even and covers the inner surface of the column. The flow rate of the incoming fluid may need to be adjusted in order to achieve this. As the film passes down the column gas is decoupled or disengaged from the liquid so that by the time the liquid has reached the bottom of the column it is effectively degassed. The disengagement of the gas from the liquid is enhanced by the increasing cross section of the column which cause the film to gradually spread out over the larger area with a consequent gradual reduction in film thickness. Disengaged, substantially liquid free gas rises in the column, passing through the center 30 of the baffle 16, and is vented through the top of the column 26.

The following Example further illustrates the invention.

EXAMPLE

A cationic monomer containing 12 ppm (12 mg/l) of oxygen was introduced into the column described above at a rate of 30 l/hour. Before admission to the column the monomer was mixed with nitrogen sweep gas at a pressure of 50 psi and a flow rate of 1 l/minute.

The oxygen level of monomer withdrawn from the bottom of the column was measured and found to be 250 ppb (parts per billion). The monomer was subsequently polymerised in a tube reactor.

There was no visible build up of polymer in the column.

The invention is not restricted to the above described specific embodiment or Example and many modifications can be made. Thus in some cases perfectly satisfactory degassing can be obtained with a column that is of substantially uniform cross section. The number of inlets 14 is not limited to two but can be increased to any number as desired or reduced to one.

The upper part of the column 10 may be equipped with means for flushing away with water any deposits of liquid that may have been carried up the column by the rising gases.

Although the invention has been described with reference to the degassing of liquid monomers the invention can be applied to other liquids where degassing is required such as solvents and emulsions.

The invention claimed is:

1. An apparatus for degassing liquids comprising a column, inlet means for admitting liquid to be degassed together with sweep gas tangentially into the column, the sweep gas having been mixed with the liquid prior to admission to the column, a tubular baffle within the column adjacent the inlet means, for directing fluid from the inlet means down the column whereby gas disengages from the liquid and rises through the baffle to the top of the column and degassed liquid accumulates at the bottom of the column, wherein the apparatus is in combination with a reactor for polymerizing liquid monomer.

2. Apparatus as claimed in claim 1, wherein the column, at least below the inlet means, is of increasing cross section.

3. Apparatus as claimed in claim 1, wherein the inlet means includes a plurality of inlets into the column.

4. Apparatus as claimed in claim 3, wherein the inlets are spaced around the column at the same level.

5. Apparatus as claimed in claim 1, wherein means are provided above the level of the inlet means for flushing away deposits of liquid on the inner surface of the column.

6. Apparatus as claimed in claim 1, wherein the baffle is an open ended tube which defines with the inner surface of the column an annulus into which the fluid is delivered by the inlet means, the top of the annulus being closed.

7. A method of degassing a liquid comprising the steps of admitting liquid to be degassed together with sweep gas tangentially into a column, directing the incoming liquid down the column to form a film on the inner surface of the column whereby gas disengages from the liquid and rises up the column and degassed liquid accumulates at the bottom of the column.

8. A method as claimed in claim 7, wherein the film on the inner surface of the column is caused to spread out over a bigger area thereby reducing the thickness of the film.

9. A method as claimed in claim 7, wherein the fluid admitted to the column is directed downwardly by a baffle which prevents gas disengaged from the incoming fluid from rising in the column until the fluid has moved below the baffle.

10. A method as claimed in claim 7, wherein any deposit of liquid in the column above the level of admission of fluid into the column is flushed away.

11. A method as claimed in claim 7, wherein the liquid to be degassed is a cationic monomer.

12. A method as claimed in claim 11, wherein the degassed monomer is polymerized.

13. A method as claimed in claim 7, wherein the sweep gas is nitrogen.

* * * * *